Nov. 10, 1959    G. A. LYON    2,912,278
WHEEL COVER

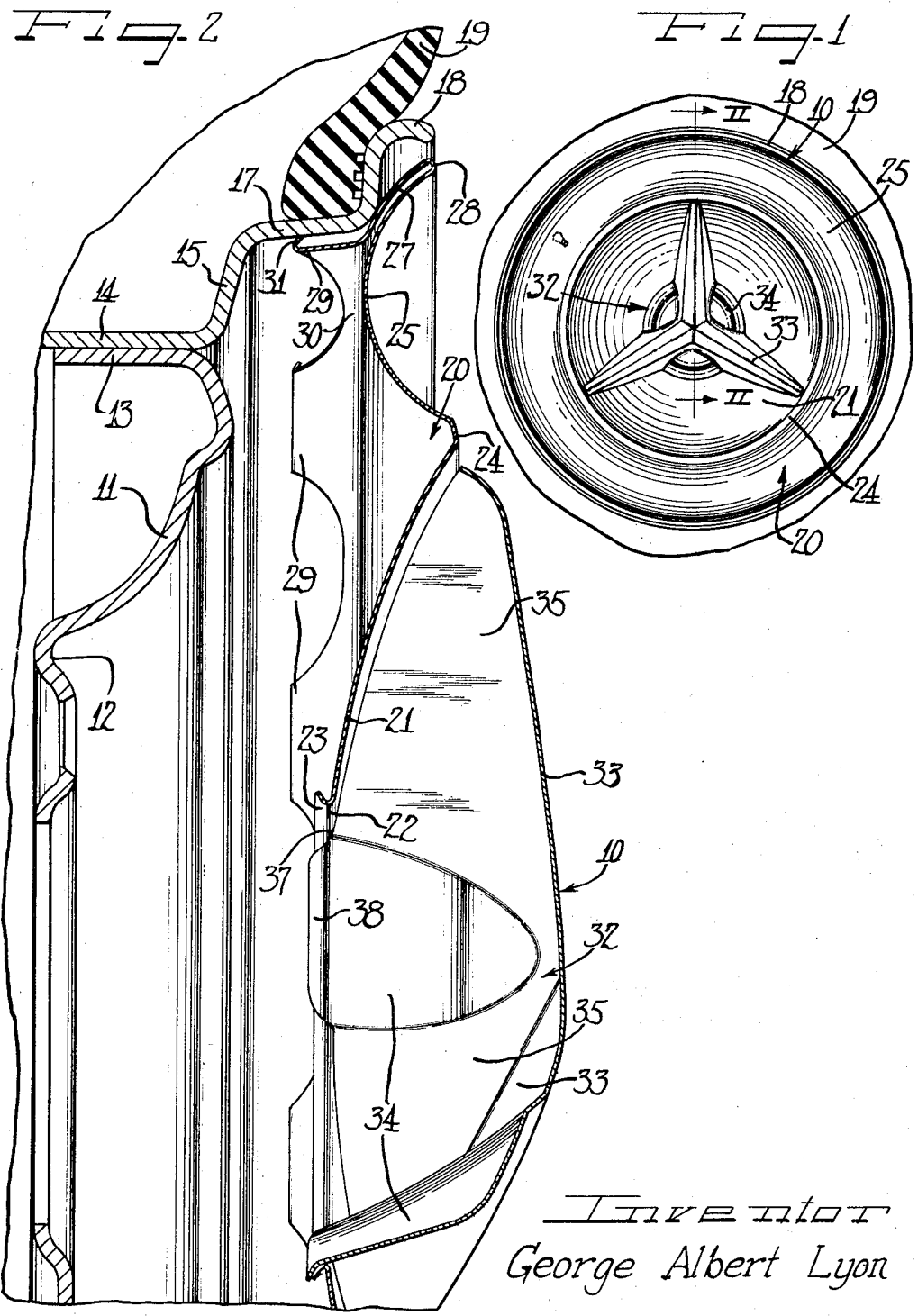

Filed July 1, 1955    3 Sheets-Sheet 2

Inventor
George Albert Lyon

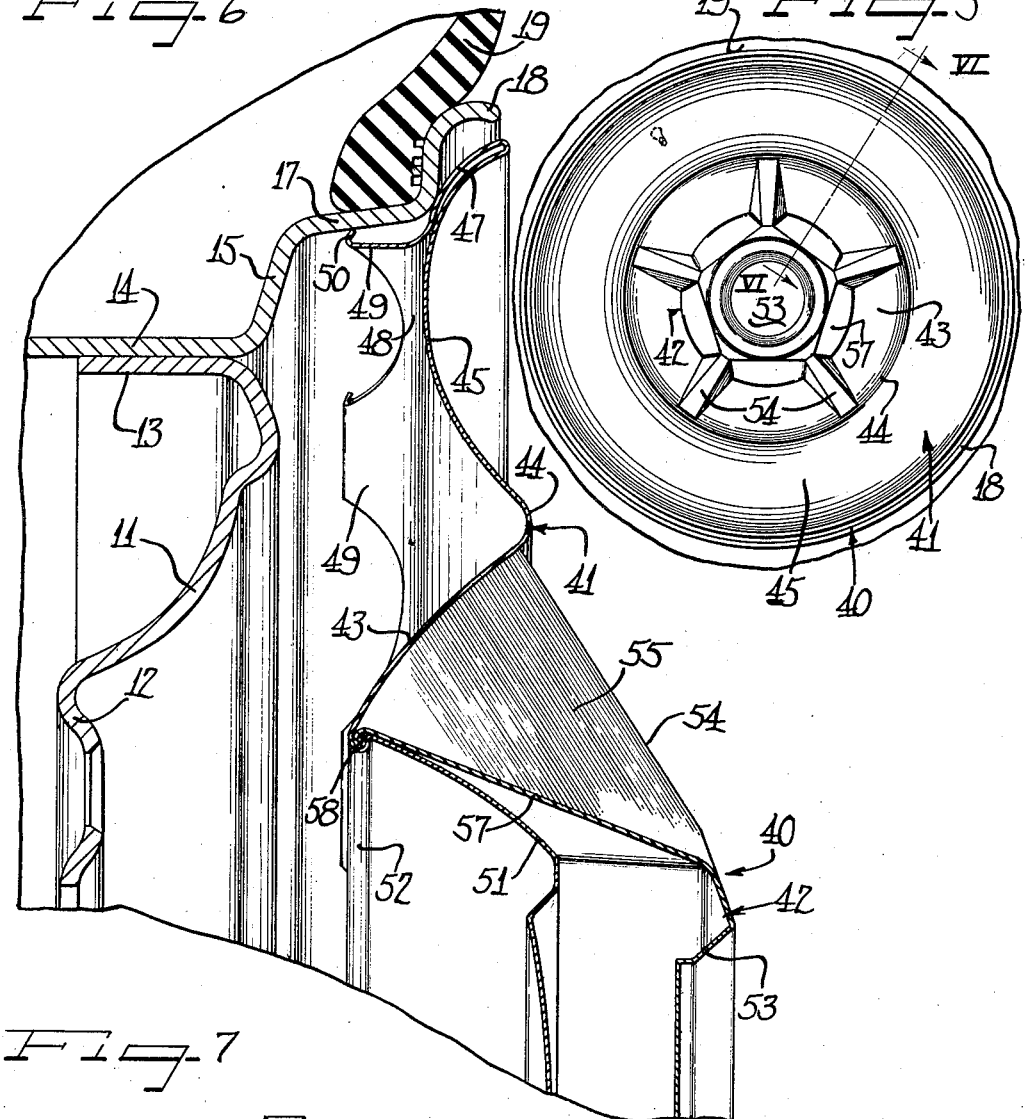

United States Patent Office 2,912,278
Patented Nov. 10, 1959

2,912,278

WHEEL COVER

George Albert Lyon, Detroit, Mich.

Application July 1, 1955, Serial No. 519,343

15 Claims. (Cl. 301—37)

The present invention relates to improvements in wheel structures and more particularly concerns the ornamental and protective covering of the outer sides of vehicle wheels.

An important object of the present invention is to provide an improved wheel structure having at the outer side thereof a protective and ornamental cover with a novel central ornamental construction.

Another object of the invention is to provide an improved wheel cover for disposition at the outer side of a vehicle wheel and in which the wheel cover has a novel central ornamental construction affording the appearance of a wheel with a "knock-off" handled cap nut attachment member.

A further object of the invention is to provide a vehicle wheel cover having a novel spoke-like structure thereon.

Still another object of the invention is to provide improved means for attaching a central spoke member to a cover plate.

It is a further object of the invention to provide a novel snap-on connection for composite cover assemblies.

Yet another object of the invention is to provide simple and inexpensive means for connecting one cover member to another cover member in a composite cover assembly.

Other objects, features and advantages of the present invention will be readily apparent from the following detailed description of certain preferred embodiments thereof taken in conjunction with the accompanying drawings, in which:

Figure 1 is an outer side elevational view of a vehicle wheel structure embodying features of the invention;

Figure 2 is an enlarged diametrical sectional view taken substantially on the line II—II of Figure 1;

Figure 5 is an outer side elevational view of a modification of the wheel structure;

Figure 6 is a fragmentary radial sectional view taken substantially on the line VI—VI of Figure 5; and Figure 7 is an outer side elevational view of the central spoke crown cap of the cover of Figures 5 and 6 prior to completion thereof for assembly with the supporting cover plate.

Figure 3:
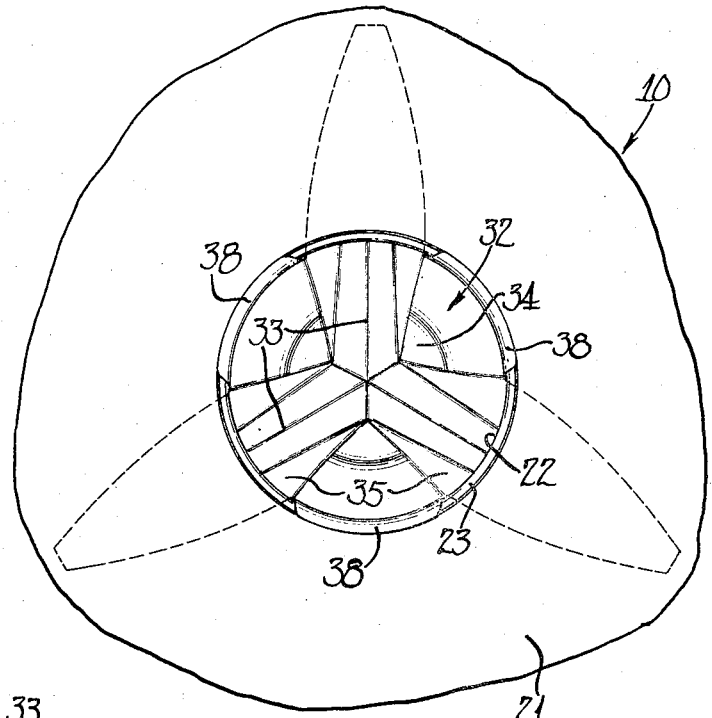
Figure 3 is a fragmentary rear elevational view of the central portion of the cover of Figure 2.

Having reference to Figures 1 and 2, a wheel cover 10 embodying features of the invention is adapted to be applied to the outer side of a vehicle wheel such as an automobile wheel having a disk spider wheel body 11 provided with a central bolt-on flange 12 and a radially outer marginal axially extending attachment flange 13. The wheel body supports a multiflange drop center tire rim including a base flange 14 to which the wheel body flange 13 is secured in a suitable manner. At the axial outer side of the base flange 14 is a generally axially outwardly facing and generally radially extending side flange 15 merging with a generally axially outwardly extending and radially inwardly facing and radially outwardly slanting or oblique intermediate flange 17 from which extends at the axially outer side a generally radially outwardly and then axially outwardly turned terminal flange 18. The tire rim is adapted to support a pneumatic tire 19 which may be of the tubeless type or may be a tire and tube assembly.

The cover 10 comprises a main body member 20 which is preferably a sheet metal plate made up as a stamping or drawn member from suitable materials such as stainless steel, brass, aluminum alloy or other suitable sheet or strip stock. In the present instance the cover plate 20 comprises a central portion 21 for overlying the wheel body 11 and may be provided with a central aperture for registration with the central aperture in the bolt-on flange 12 for projection therethrough of the hub of an axle structure (not shown) to which the wheel may be attached in service. An underturned finishing and reinforcing flange 23 about the aperture 22 may extend generally axially inwardly and radially outwardly at the inner side of the margin or edge defining the opening 22.

In a preferred form, the central portion 21 of the cover plate may be dished inwardly as shown, with an annular reinforcing and generally axially outwardly extending rib 24 at the radially outer side of the dished portion spaced substantially from the edge defining the opening 22. Radially outwardly from the rib 24 is an inwardly dished annular marginal portion 25 adapted to overlie the juncture of the wheel body with the tire rim and substantially overlie the tire rim.

The generally dished formation, that is the concave cross-sectional shape of the marginal portion 25 may extend to its radially outer extremity where an underturned annular complementary flange 27 joins the dished portion on a reinforcing and finishing bead-like or rib extremity 28. In assembly with the wheel the underturned flange 27 is engageable at its radially inner margin with the shoulder between the intermediate and terminal flanges 17 and 18 for thereby supporting the cover in spaced relation to the wheel body and in otherwise substantially spaced relation to the tire rim and with the radially outer extremity of the underturned flange and the overlying marginal portion of the cover also spaced from the terminal flange 18 to afford a gap therebehind for reception of balancing weights if necessary.

Means for attaching the cover to the wheel in press-on, pry-off relation herein comprise a series of cover retaining fingers 29 formed as axially inwardly extensions from a continuous annular axially inwardly extending flange portion 30 from the inner extremity of the underturned flange 27 and of a diameter somewhat less than the diameter of the intermediate flange 17 about the axially outer portion thereof so that in assembly with the wheel the cover flange 30 can telescope within the intermediate flange. The retaining fingers 29 are radially inwardly deflectable resiliently and have short and stiff radially and axially outwardly oblique retaining terminals 31 thereon for engagement under resiliently tensioned retaining gripping thrust against the intermediate flange 17. This sort of retaining structure is covered in my Patent 2,624,634, issued January 6, 1953.

It will be appreciated that because of the symmetrically concave convex formation of the radially outer marginal portion of the cover marginal section 25 and the underturned flange 27, the outer marginal extremity of the cover plate 20 is resiliently flexible for accommodating weaving movements of the tire rim in service. This is desirable to avoid working of the retaining fingers 29 from the tire rim, especially where the gauge of the metal of the tire rim and wheel are small so that there is substantial weaving during turning maneuvers of the vehicle.

For ornamentation, as well as to close the central opening 22 in the cover plate 20, and more particularly to afford a more or less sporty appearance for the wheel cover generally simulating the outer side of a sport car wheel having a "knock-off" attachment nut cap arrangement, the cover plate 20 carries a central cover member 32. This central member may also be made up as a sheet metal stamping of an appropriate material such as stainless steel, brass, aluminum or the like as may be preferred, but preferably a material that is endowed with a substantial amount of inherent resiliency, or at least is capable of acquiring substantial resiliency as an incident to cold working thereof during formation of the member 32 by a stamping or drawing process.

Herein the central cover member component 32 is in the form of a plurality of generally radially extending spoke-like ears or arms 33, herein shown as three in number but which may be of smaller or greater number if preferred, with gussetlike juncture reinforcing, outwardly arched, segmental portions 34 defining a central cap structure of a maximum diameter substantially the same as the diameter of the central opening 22 in the cover plate 20.

Each of the radiating arms 33 has a longitudinal crest or ridge and generally axially inward and circumferentially outwardly divergently flaring respective opposite longitudinal side walls 35 that have the inner edges thereof generally conformed or complementary to the dished outer face contour of the inner portion 21 of the cover plate 20. By preference, moreover, the inner edges of the side wall or wing flanges 35 of the spoke arms are so shaped that they are out of engagement or in spaced relation to the opposing outer surface of the cover portion 21 except at shoulders 37 contiguous the inner margins of the cap segments 34 so that in assembly of the arm cap member 32 with the cover plate 20, the shoulders 37 will engage the cover plate at the turned edge defining the opening 22 and thereby establish the axial assembled relation of the cover components.

For retaining the cover components 20 and 32 in assembled relation, means are provided at the central portion of the assembly preferably of a snap-on type. To this end, the inner margins of the cap segments 34 are provided with retaining flange extensions 38 which are turned generally axially inwardly and radially outwardly substantially complementary to the inwardly facing surfaces of the turned flange 23 about the central opening 22 of the cover member 20. The construction and relationship of the flange extensions 38 is such that they will engage behind the flange 23 and maintain a resilient tensioned gripping engagement therewith. For this purpose the diameter described about the juncture portions of the flanges 38 with the cap segments 34 is slightly greater than the minimum diameter at the opening 22. Furthermore, the space between the outwardly facing surfaces of the flanges 38 and the shoulders 37 is such that under the resilient tensioned gripping engagement of the flanges 38 with the flange 23, the shoulders 37 are drawn tightly against the inner margin of the cover member portion 21.

In Figure 3 is shown how the retaining flanges 38 symmetrically retainingly grip the flange 23.

Figure 4:
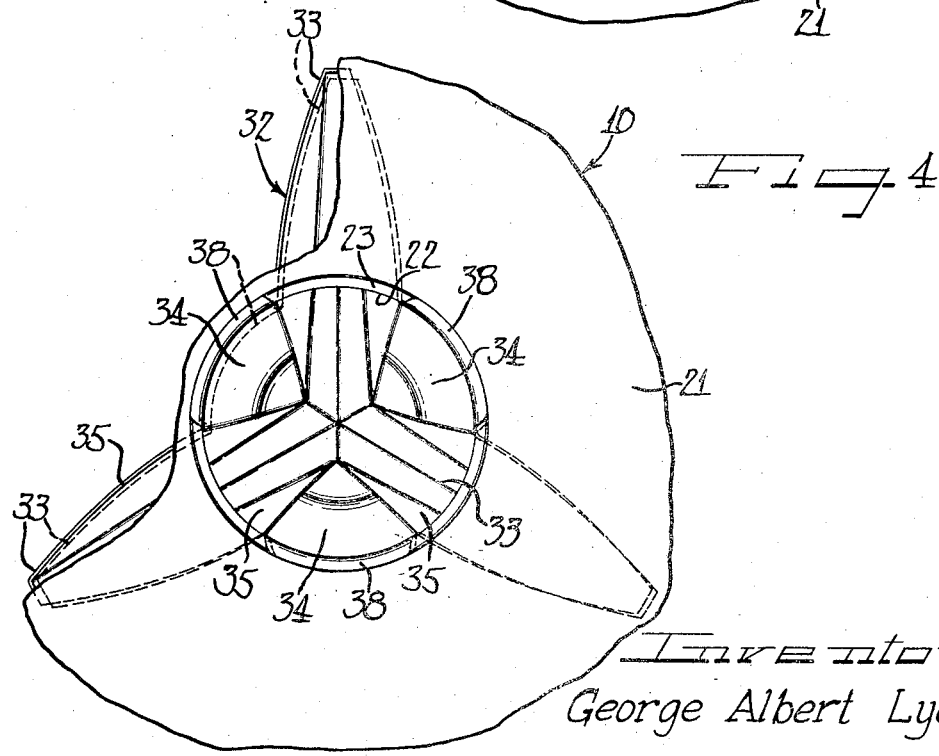
Figure 4 is a view similar to Figure 3 but illustrating steps in the assembly of the central cover member of the assembly with the cover plate.

Since the arm side walls 35 and the cap segments 34 are resilient and mutually cooperative to resist, resiliently, deflectional deformations thereof, especially in a radial direction, such resilience is taken advantage of in effecting assembly of the central cover component 32 with the cover member 20, as schematically illustrated in Figure 4. That is, one or two of the retaining flanges 38 may be engaged behind the flange 23 and then by resiliently deflectional depression of the remaining one or two of the retaining flanges 38, herein shown as one of such flanges at the left side of Figure 4, resilient yielding of the arms 33 and the cap segments 34 enables movement of such remaining flange 38, as shown in dash outline, past the inner extremity defining the opening 22 and behind the flange 23. Upon release of the compressing force the remaining flange 38 snaps into retaining engagement cammingly and under resilient gripping tension with the flanges 23 as shown in full outline in Figures 3 and 4.

Although the central cover member 32 is held snugly in engagement with the cover plate 20, by virtue of the frictional interlocked relationship of the retaining flanges 38 with the turned cover flange 23, and of the shoulders 37 on the outer side of the cover plate inner margin, it is possible to turn the arm member 32 relative to the cover plate 20 for such purposes as cleaning the cover plate inner annular portion 21.

Furthermore, by reason of the spaced relation of the inner edges of the arm side wall flanges 35 to the cover portion 21 throughout the major extent of such arm side walls radially outwardly beyond the shoulders 37, it is possible for the central cover portion 21 to flex axially inwardly in response to axially inward pressures against the arm member 32 such as may be caused by curbing or other external forces, without the radially outer portions of the arm side wall flanges 35 contacting the cover plate 20. Thereby strains that might cause deformation of the arms 33 due to such inward pressure are avoided. In other words, the annular cover portion 21 thus affords a resilient cushion against damaging pressures against the arm member 32.

In the modification of Figures 5–6, a cover 40 is constructed and arranged for disposition at the outer side of a vehicle wheel which may be of the same construction as shown in Figure 2 and accordingly similar reference numerals identify similar parts of such wheel. The cover 40 includes a circular cover plate 41 for substantially covering the wheel body 11 and the tire rim, and a central spoke arm cap member 42 supported thereby.

The cover plate 41 may be in several respects of similar construction as the cover plate 20 described hereinabove. To this end the cover plate 41 has an annular dished portion 43 that extends generally radially and axially outwardly to an annular axially outwardly projecting reinforcing rib 44 at the radially outer side of which is an annular inwardly dished marginal cover portion 45 having behind the radially outer portion thereof an underturned complementary flange 47 from which extends an axially inwardly directed annular flange extension 48 carrying cover retaining finger extensions 49 having short and stiff oblique outwardly directed terminals 50 engageable in press-on, pry-off relation with the intermediate flange of the tire rim. In this instance, however, the inner central portion of the cover plate 41 includes a generally axially outwardly projecting crown portion 51 providing a chamber therebehind of substantial depth opposite the central opening in the bolt-on flange 12. At juncture of the side wall of the crown portion 51 with the radially inner margin of the dished portion 43 is provided an annular radially inwardly projecting rib 52 that affords a generally radially outwardly opening annular groove which is substantially concealed behind the overhanging axially inner and radially outer marginal extremity of the crown side wall.

In the present instance, the groove defined by the rib 52 is utilized for retaining interengagement by means on the central arm cap 42 which may be applied to the outer side of the cover plate 41 as optional equipment. That is, the cover plate 41 as shown is a complete cover in itself. However, by applying to the outer side thereof the arm cover member 42 a substantially different appearance is afforded. Such an arrangement is especially desirable for economical standardization where, for example, different models of the same make of automobile are to be supplied with covers of generally similar construction but nevertheless differing substantially from one another to afford a desirable contrast. To this end, the inner arm cover member 42 includes a crown portion 53 from the radially outer side of which emanate a plurality of generally radially outwardly extending and axially inwardly sloping spoke-like arms 54 having side wall wing flanges 55 that merge with intermediate cap segments 57 affording the appearance of the crown 53 having a side wall 57 that has the spoke ribs 54 extending radially therefrom. In the present instance five of the spoke arms 54 are shown but it will be appreciated that more or less of such arms may be provided. Each of the arms has the edges of the side wall flanges 55 thereof opposite the annular cover portion 43 generally conforming thereto in complementary fashion so as to afford the appearance of spoke arms also emanating from the annular cover portion 43.

For connecting the arm member 42 to the cover plate 41, the cap side wall segments 57 intermediate the spoke arms 54 are provided with flange extensions 58 which are turned inwardly from the straight continuation relation thereof to the respective segments 57, as shown in Figure 7, into generally radially inwardly extending projecting flanges as shown in Figure 6. The diameter about the inner extremities of the turned retaining flanges 58 is preferably slightly less than the diameter at the root of the groove defined by the annular rib 52. Therefore, in the assembled relation the inturned retaining extension flanges 58 grip resiliently within the groove 52 so that there is a snug shouldering of the flange within the groove behind the generally axially inwardly directed shoulder defined at the axially outer side of the groove.

In assembling the cap member 42 with the cover plate 41, the cap member is pressed axially inwardly and the cap flanges 57 extend resiliently radially outwardly as the retaining flanges 58 cam inwardly along the side of the crown 51 until the retaining flanges 58 snap into the groove of the rib 52. Since the side walls 55 and the segment portions 57 are resiliently flexible they all mutually cooperate to afford the resilient tensioning of the retaining flanges 58 within the groove of the rib 52.

In the cover 40, similarly as in the cover 10, turning of the arm member 42 is permitted since there is but a frictional interengagement between the cover components. Furthermore, axially inward pressures against the cap member 42 will be resiliently cushioned by the cover plate 41.

It will be understood that modifications and variations may be effected without departing from the scope of the novel concepts of the present invention.

I claim as my invention:

1. In a cover for disposition at the outer side of a vehicle wheel, a circular cover member and a hollow sheet metal spoke-arm cap member provided with a central cap portion with hollow spoke arms emanating generally radially therefrom and the spoke arms and the cap member comprising a plurality of angularly related resiliently deflectable panels, the axially inner edges defining certain of said panels having retaining flange means thereon engageable retainingly with said circular cover member.

2. In a wheel cover structure, a sheet metal cap member having a plurality of generally radially extending arms and a central cap portion comprising a plurality of segmental arched portions between and connecting the arms, said segmental portions having flanges at the inner margins thereof for retaining engagement with a supporting member.

3. In a wheel cover structure, a sheet metal cap member having a plurality of generally radially extending arms and a central cap portion comprising a plurality of segmental arched portions between and connecting the arms, said segmental portions having flanges at the inner margins thereof for retaining engagement with a supporting member, said segmental portions and said arms being mutually resilient and resisting radial deflection of said segmental portions.

4. In a cover for disposition at the outer side of a vehicle wheel, a cover member having a central portion providing generally axially inwardly facing shoulder structure, and an ornamental arm member comprising a plurality of generally radially extending hollow arms with side walls connected together at the radially inner ends of the arms by generally radially facing panel portions to provide a continuously connected arm structure and with said panels circumferentially spaced by the width of the spacing between the inner end portions of the arm side walls, said radially facing connecting panels having on the axially inner margins thereof shoulder structure retainingly interengageable with and behind the shoulder structure of the cover member.

5. In a cover for disposition at the outer side of a vehicle wheel, a cover member having a central portion providing generally axially inwardly facing shoulder structure, and an ornamental arm member comprising a plurality of generally radially extending hollow arms with side walls connected together at the radially inner ends of the arms by generally radially facing panel portions to provide a continuously connected arm structure and with said panels circumferentially spaced by the width of the spacing between the inner end portions of the arm side walls, said radially facing connecting panels having on the axially inner margins thereof shoulder structure retainingly interengageable with and behind the shoulder structure of the cover member, said shoulder structure of the cover member comprising a central margin defining a central opening in the cover member, said shoulder structure on said panels comprising terminal flanges facing generally axially outwardly and engaged behind said aperture marginal shoulder structure.

6. In a cover for disposition at the outer side of a vehicle wheel, a cover member having a central portion providing generally axially inwardly facing shoulder structure, and an ornamental arm member comprising a plurality of generally radially extending hollow arms with side walls connected together at the radially inner ends of the arms by generally radially facing panel portions to provide a continuously connected arm structure and with said panels circumferentially spaced by the width of the spacing between the inner end portions of the arm side walls, said radially facing connecting panels having on the axially inner margins thereof shoulder structure retainingly interengageable with and behind the shoulder structure of the cover member, said shoulder structure on the cover member being provided by a turned groove portion thereon and with the groove opening generally radially outwardly, the shoulder structure on said panels comprising generally radially inwardly directed respective flanges interlockingly engageable within said groove behind the shoulder structure of the cover member.

7. In a cover for disposition at the outer side of a vehicle wheel, a cover member having a central portion providing generally axially inwardly facing shoulder structure, and an ornamental arm member comprising a plurality of generally radially extending hollow arms with side walls connected together at the radially inner ends of the arms by generally radially facing panel portions to provide a continuously connected arm structure and with said panels circumferentially spaced by the width of the spacing between the inner end portions of the arm side walls, said radially facing connecting panels having on the axially inner margins thereof shoulder structure retainingly interengageable with and behind the shoulder structure of the cover member, said shoulder structure on the cover member comprising an annular flange portion, said shoulder structure on the panels comprising turned generally axially facing respective flanges slidably underlyingly engageable with said annular flange portion and thereby enabling turning of the ornamental member relative to the cover member.

8. In a cover for disposition at the outer side of a vehicle wheel, a cover member having a central portion with a central opening therein defined by a continuous annular generally radially outwardly and axially inwardly oblique shoulder flange, and a closure cap and ornamental arm member comprising a sheet material shell dimensioned for overlying the central cover member opening and provided with generally radially outwardly projecting axially and radially inwardly opening hollow arms with connecting side wall panel segments provided at their axially inner margins with outturned oblique generally radially and axially outwardly facing connecting flanges for gripping said annular shoulder flange and thereby drawing the axially inwardly directed edges defining said arms against the axially outer side of the cover member.

9. In a cover assembly for disposition at the outer side of a vehicle wheel, a circular cover member having a central generally axially flexible portion, and means providing a central ornamental structure for the cover member and including a plurality of generally radially outwardly extending arms having the radially inner portions thereof engaging against the radially inner portion of said flexible cover portion and with the arms diverging from the engagement thereof with said radially inner portion to afford clearance radially outwardly from the engaging portions of the arms for free axially inward flexing of said flexible cover portion before the radially outer portions of the arms engage thereagainst.

10. In a cover for disposition at the outer side of a vehicle wheel, a circular cover member having a central crown portion with a radially outwardly facing side wall that has juncture with a generally radially outwardly extending portion of the cover, said juncture comprising a generally radially inwardly projecting rib-like turned portion providing a generally radially outwardly opening groove therein, and a cover ornamenting sheet material arm member having generally radially outwardly extending arms with connecting panel portions that face generally radially outwardly and are provided with generally radially inwardly extending axially inner terminal retaining flanges engageable retainingly in said groove.

11. In a one-piece resilient sheet material arm member for assembly on the outer side of a vehicle wheel cover, a plurality of generally radially outwardly extending hollow axially and radially inwardly opening arms having respective spaced apart pairs of generally circumferentially flexible side wall panels, integral generally radially facing connecting panels joining the radially inner end portions of said side wall panels angularly and being generally radially flexible, and certain of the panels having means on the edges thereof for retaining interengagement with a cover member, said side walls and connecting panels being cooperatively resiliently flexible for enabling connection of said connecting means with a cover.

12. A wheel cover structure as defined in claim 2 wherein said flanges on the segmental portions are in the form of circumferentially arcuate generally radially outwardly projecting flanges.

13. A wheel cover structure as defined in claim 2 wherein said flanges on the segmental portions are turned generally radially inwardly under the segmental portions.

14. In a rotatable arm cap shell for assembly with a cover plate, a hollow central cap portion having an axially outer closed side and opening toward the axially inner side thereof and provided with a generally radially facing side wall having hollow arms opening thereinto through the axially inner end of the side wall, said hollow arms opening both axially inwardly and radially inwardly and projecting radially outwardly from the central cap portion side wall, the radially inner ends of the arm side walls being freely separated, the central cap portion side wall comprising a plurality of correlated segments between said radially inner end portions of the arm side walls and connecting together the side walls of adjacent arms, the axially inner portion of the cap shell having means thereon for interengagement with a companion cover part with which the cap shell is adapted to be used on a wheel.

15. The structure defined in claim 14, wherein said interengagement means comprise respective flange extensions from said segments.

References Cited in the file of this patent

UNITED STATES PATENTS

| | | |
|---|---|---|
| 2,092,975 | Hunt et al. | Sept. 14, 1937 |
| 2,115,182 | Sinclair | Apr. 26, 1938 |
| 2,137,186 | Stageberg | Nov. 15, 1938 |
| 2,158,125 | Horn et al. | May 16, 1939 |
| 2,276,405 | Lyon | Mar. 17, 1942 |
| 2,434,940 | Lyon | Jan. 27, 1948 |
| 2,493,003 | Lyon | Jan. 3, 1950 |
| 2,652,286 | Lyon | Sept. 15, 1953 |
| 2,674,495 | Lyon | Apr. 6, 1954 |
| 2,698,203 | Landell | Dec. 28, 1954 |
| 2,712,474 | Gaylord | July 5, 1955 |

FOREIGN PATENTS

| | | |
|---|---|---|
| 947,051 | Germany | Aug. 9, 1956 |